US012343775B2

(12) United States Patent
Ribeiro Dias et al.

(10) Patent No.: US 12,343,775 B2
(45) Date of Patent: *Jul. 1, 2025

(54) SOLAR MODULE RECYCLING AND TESTING

(71) Applicant: SOLARCYCLE, Inc., Odessa, TX (US)

(72) Inventors: Pablo Ribeiro Dias, Odessa, TX (US); Suvi Sharma, Odessa, TX (US)

(73) Assignee: SOLARCYCLE, Inc., Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,451

(22) Filed: Feb. 15, 2024

(65) Prior Publication Data

US 2024/0181511 A1 Jun. 6, 2024

Related U.S. Application Data

(63) Continuation of application No. 18/461,733, filed on Sep. 6, 2023, now Pat. No. 12,005,485, which is a
(Continued)

(51) Int. Cl.
 *B02C 23/14* (2006.01)
 *B02C 13/26* (2006.01)
 (Continued)

(52) U.S. Cl.
 CPC ............... *B09B 3/35* (2022.01); *B02C 13/26* (2013.01); *B02C 18/0084* (2013.01); *B02C 23/14* (2013.01); *B09B 2101/15* (2022.01)

(58) Field of Classification Search
 CPC ..... B02C 13/26; B02C 18/0084; B02C 23/10; B02C 23/14; B02C 23/16
 See application file for complete search history.

(56) References Cited

U.S. PATENT DOCUMENTS

| 4,309,204 A | 1/1982 | Brooks |
| 6,781,344 B1 * | 8/2004 | Hedegor ............ G01R 31/3865 |
| | | 209/575 |

(Continued)

FOREIGN PATENT DOCUMENTS

| CN | 103978021 B | 8/2014 |
| CN | 106629738 | 5/2017 |

(Continued)

OTHER PUBLICATIONS

English Translation of CN 115358968 A; Inv: Wang et al.; Pub. Date: Nov. 2022 (Year: 2022).*

(Continued)

*Primary Examiner* — Joseph C Rodriguez

(57) ABSTRACT

Embodiments relate to one or more techniques that may be employed alone or in combination, in the refurbishment or recycling of used solar modules. In certain approaches, a (heated) wire may be used to cut through one or more layers (e.g., front encapsulant, back encapsulant, both front and back encapsulant, backsheet) of a solar module that is being recycled or refurbished. Some approaches may employ testing of a used solar module, alone or in combination with information (e.g., as part of a received package) regarding parameters of a used solar module such as panel size, width, length, height, thickness of glass, or others. According to specific embodiments, used solar modules may be subjected to various cleaning processes at one or more points during refurbishment/recycling.

20 Claims, 19 Drawing Sheets

Related U.S. Application Data continuation of application No. 18/304,052, filed on Apr. 20, 2023, which is a continuation-in-part of application No. 18/147,585, filed on Dec. 28, 2022.

(60) Provisional application No. 63/333,475, filed on Apr. 21, 2022, provisional application No. 63/333,886, filed on Apr. 22, 2022, provisional application No. 63/389,325, filed on Jul. 14, 2022.

(51) Int. Cl.
*B02C 18/00* (2006.01)
*B09B 3/35* (2022.01)
*B09B 101/15* (2022.01)

(56) References Cited

U.S. PATENT DOCUMENTS

| | | | |
|---|---|---|---|
| 12,005,485 B2 * | 6/2024 | Ribeiro Dias | B02C 13/00 |
| 2002/0189977 A1 | 12/2002 | Maehata et al. | |
| 2007/0189435 A1 | 8/2007 | Tani et al. | |
| 2012/0325676 A1 * | 12/2012 | Taylor | C25C 1/16 |
| | | | 75/743 |
| 2014/0000316 A1 | 1/2014 | Coggin | |
| 2020/0148585 A1 | 5/2020 | Nakano et al. | |
| 2020/0198316 A1 | 6/2020 | Coustier et al. | |
| 2020/0282432 A1 * | 9/2020 | Khadilkar | B07C 5/342 |
| 2023/0019898 A1 | 1/2023 | Lee | |
| 2023/0116994 A1 | 4/2023 | Tahata et al. | |

FOREIGN PATENT DOCUMENTS

| | | | | |
|---|---|---|---|---|
| CN | 110404920 A | | 11/2019 | |
| CN | 113215412 A | | 8/2021 | |
| CN | 115358968 A | * | 11/2022 | |
| EP | 4169619 A1 | * | 4/2023 | ............... B03B 9/06 |
| FR | 3096833 A1 | | 3/2022 | |
| FR | 3140289 A1 | | 4/2024 | |
| JP | 2017-006839 A | | 1/2017 | |
| KR | 10-2013-0060708 | | 6/2013 | |
| KR | 10-2020-0095749 | | 8/2020 | |
| KR | 102283519 B1 | | 7/2021 | |
| KR | 1020210083721 A | | 7/2021 | |
| KR | 10-2303527 | | 9/2021 | |
| KR | 10-2337586 | | 12/2021 | |
| WO | 2017100443 | | 6/2017 | |
| WO | 2018039146 | | 3/2018 | |
| WO | 2019122567 A1 | | 6/2019 | |
| WO | 2023150831 | | 8/2023 | |

OTHER PUBLICATIONS

English Translation of EP4169619 A1; Inv: Stephan; Pub. Date: Apr. 2023 (Year: 2023).*

Chalaux, Recycled Silicon for Chlorosilane Production, ROSI, Evonik, Sep. 11, 2024, 15 pgs., www.rosi-solar.com, www.evonik.com.

Wang et al., Deep-Learning-Based Automatic Detection of Photovoltaic Cell Defects in Electroluminescence Images, Sensors, MDPI, Dec. 27, 2022, pp. 1-21, https://doi.org/10.3390/s23010297, Basel, Switzerland.

* cited by examiner

SOLAR MODULE RECYCLING AND TESTING

CROSS-REFERENCE TO RELATED APPLICATIONS

The instant nonprovisional patent application is a Continuation of U.S. patent application Ser. No. 18/461,733 filed Sep. 6, 2023, which is a Continuation of U.S. patent application Ser. No. 18/304,052 filed Apr. 20, 2023, which is a Continuation-In-Part (CIP) of U.S. Nonprovisional patent application Ser. No. 18/147,585 filed Dec. 28, 2022, which also claims priority to U.S. Provisional Patent Application No. 63/333,475 filed Apr. 21, 2022, U.S. Provisional Patent Application No. 63/333,886 filed Apr. 22, 2022, and U.S. Provisional Patent Application No. 63/389,325 filed Jul. 14, 2022, each of which is incorporated by reference herein for all purposes.

BACKGROUND

As world population increases, the earth is subjected to escalating environmental stress. One form of stress is manifest in rising global temperatures attributable to the burning of fossil fuels in order to provide energy needs.

Alternative energy sources can provide power, while lessening the carbon dioxide burden on the planet. One important source of alternative energy is solar power.

Solar modules are complex manufactured items. They harness the sun's energy and convert it into a usable energy source for residential, commercial and utility-scale applications. As the climate has been significantly impacted by the use of fossil fuels over the past century, the need for alternative sources of energy like solar has taken on greater importance.

Another form of environmental stress imposed upon the earth, is the accumulation and disposal of waste products from human activity. Accordingly, rather than discarding a solar module at the end of its lifetime, it may be desirable to recycle material(s) from a solar module for reuse and thereby avoid deposition in a landfill.

SUMMARY

Embodiments relate to one or more techniques that may be employed alone or in combination, in the refurbishment or recycling of used solar modules. In certain approaches, a (heated) wire may be used to cut through one or more layers (e.g., front encapsulant, back encapsulant, both front and back encapsulant, backsheet) of a solar module that is being recycled or refurbished. Some approaches may employ testing of a used solar module, alone or in combination with information (e.g., as part of a received package) regarding parameters of a used solar module such as panel size, width, length, height, thickness of glass, or others. According to specific embodiments, used solar modules may be subjected to various cleaning processes at one or more points during the refurbishment or recycling.

DESCRIPTION

Solar modules exist in a variety of types and architectures. Examples of such modules can include but are not limited to:
  Monocrystalline Solar Panels (Mono-SI)
  Polycrystalline Solar Panels (p-Si)
  Amorphous Silicon Solar Panels (A-SI)
  Cadmium telluride photovoltaics (CdTe)
  Copper indium gallium selenide modules (CIGS)
  Copper indium selenide modules (CIS)
  Concentrated PV Cell (CVP)
  Biohybrid Solar modules
  Monofacial modules
  Bifacial modules
  Modules without encapsulant
  Silicon heterojunction solar modules
  tunnel oxide passivated contact solar modules (TOPCON)
  passivated emitter and rear contact solar modules (PERC)
  Tandem-junction Solar Panels
  Perovskite-based Solar Panels
  Glass-Backsheet Solar Panels
  Glass-Glass Solar Panels
  Building-Integrated Solar Panels
  Polymer-Based Solar Panels
  Solar Roof Tiles
  Solar Roof Shingles Solar modules can last decades, with some degradation in performance over a module's lifetime. Also, solar modules that have been deployed on residential rooftops and other commercial and utility-scale applications for a number of years, may be decommissioned for a variety of reasons.

For example, (residential, commercial, utility) users of solar panels may desire to exchange their modules for newer, higher performing modules in order to maximize the amount of energy obtained from a solar array.

As more solar modules reach the end of their useful lives and/or are relinquished by their owners, it is desirable to dispose of the panels in an environmentally-friendly and economically-feasible way. Alternatively, it may be desired to refurbish and reuse existing solar modules to prolong their lifetimes and reduce cost.

Once it is determined that a solar module is no longer useful to its owner, e.g.:
  the module has reached the end of its current deployment due to non- or underperformance,
  the module has been damaged in transit, or
  for other (e.g., economic) reasons,
in order to avoid discarding the module into a landfill, the module may either be recycled or refurbished and reused.

Accordingly, to determine whether a solar module should be recycled or refurbished and reused, embodiments may implement one or more of the following processes, alone or in various combinations and sequences.
  cleaning;
  inspection to determine reusability;
  testing;
  remove cabling;
  remove frames surrounding the panel and/or junction boxes (either manually, or e.g., using an automated deframing machine).
  transparent front layers and potentially other layers (e.g., the backsheet) may be removed using a delamination process.
  Remaining layers (of, e.g., a laminate) may be shredded. Shredded materials can be separated using one or more processes in order to extract various possible reusable materials therefrom (e.g., valuable commodity metals such as silicon, silver, and/or copper).

Figure 1:
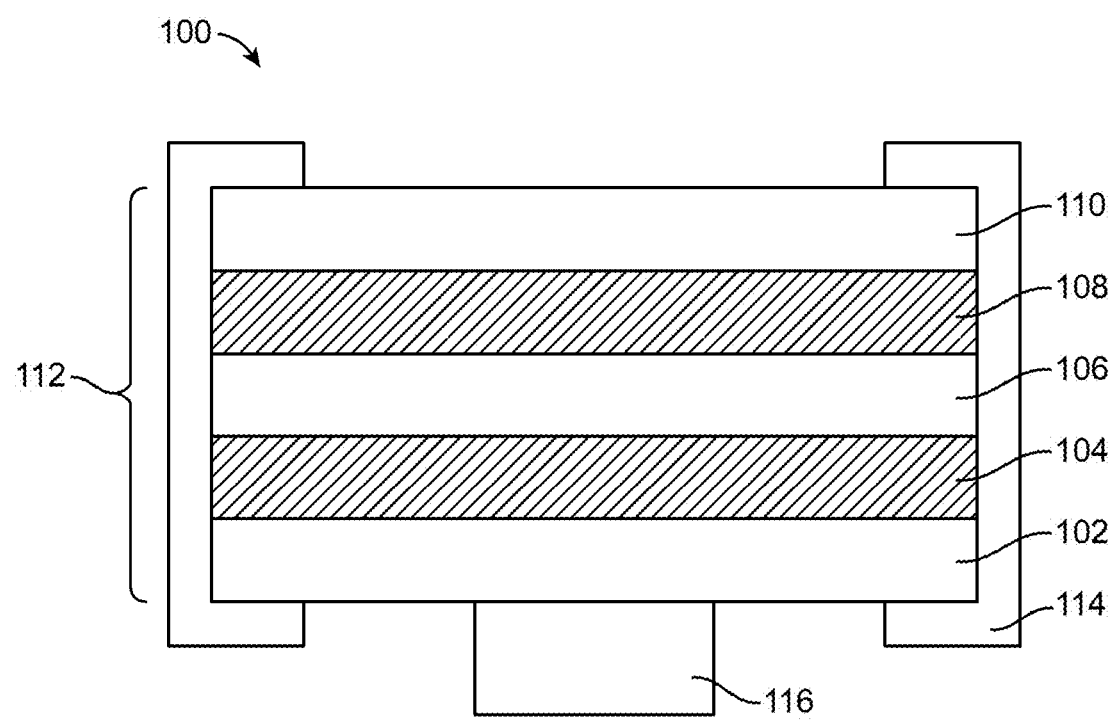
FIG. 1 shows a cross-sectional view of a monofacial solar module according to an example.

Embodiments relate to various techniques that may be employed, alone or in combination, for the recycling and/or refurbishment of solar modules. FIG. 1 shows a cross-sectional view of a monofacial solar module according to an example.

The PV module 100 is made of different layers assembled into the structure shown in FIG. 1. These layers of FIG. 1 are not drawn to scale.

The layers of FIG. 1 can be simplified as:
  substrate (backsheet) 102,
  back encapsulant 104, e.g., Ethylene-vinyl acetate (EVA), silicone, Polyvinyl butyral (PVB), IONOMER, polyolefin elastomer (POE)
  solar cell 106 comprising PV material (including, e.g., but not limited to: doped single crystal, polycrystalline, or amorphous silicon, Group III-V materials) and metallization,
  front encapsulant 108,
  transparent front cover sheet 110 (e.g., typically glass).
  This grouping of layers is referred to as a laminate 112.

It is further noted that bifacial modules also exist. Such bifacial modules may exhibit a structure similar to that of FIG. 1, but have a transparent (e.g., glass) layer instead of a backsheet layer. This allows (e.g., reflected) light to enter the module from the back.

The laminate in FIG. 1 is surrounded by a frame 114. The frame may comprise a stiff metal such as aluminum. Alternatively, a frame material may be plastic, comprising e.g., polycarbonate.

A junction box 116 is also part of the module. The junction box may be potted (more common in newer models) or non-potted (more common in older models). In a the potted PV junction box, the foils coming out of the solar panel are soldered to the diodes in the junction box, and the junction box is potted or filled with a type of sticky material to allow thermal transfer of heat to keep the solder joint in place and prevent it from falling. Fabrication may take longer but creates a better seal.

In the non-potted PV junction box, a clamping mechanism is used to attach the foil to the wires in the junction box. This can involve a faster assembly, but may not be as robust. A module having a potted junction box may be more amenable to recycling or refurbishment.

Figure 1A:
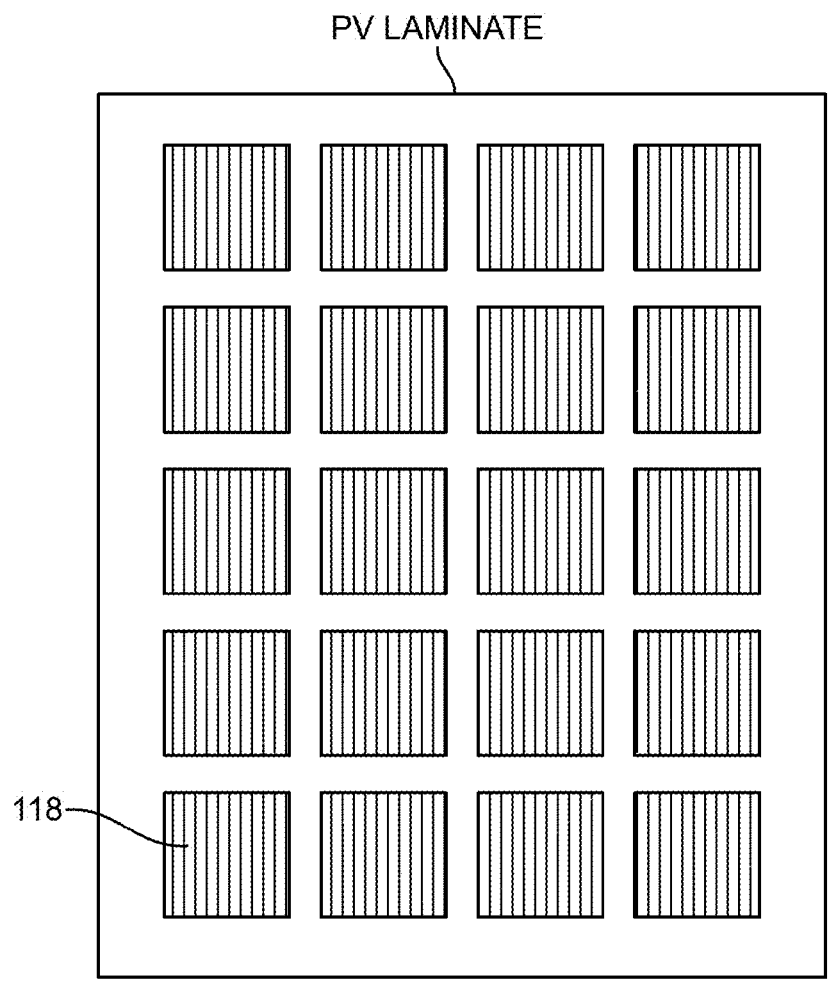
FIG. 1A shows a simplified overhead view of the laminate of a solar module, lacking the frame and the top transparent sheet.

FIG. 1A shows a simplified overhead view of the laminate of a solar module, lacking the frame and the top transparent sheet. FIG. 1A shows solar cells including patterned metallization 118, which may comprise, e.g., a valuable metal such as silver.

Figure 2:
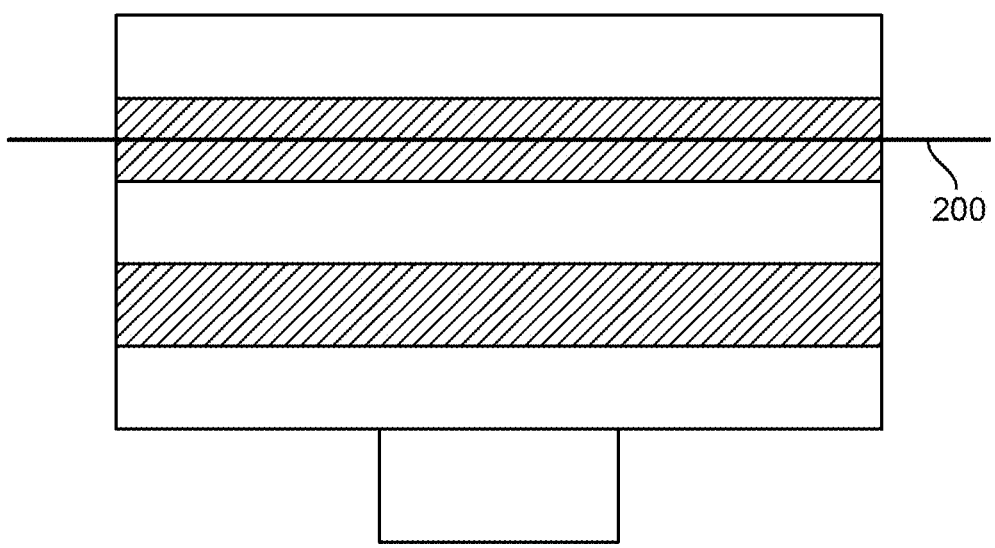
FIG. 2 is a simplified cross-sectional view showing a wire to cut through one or more layers.

Prior to delamination, the frame is removed. Then, as shown in FIG. 2, according to embodiments a thin wire 200 may be used to cut through one or more layers (e.g., front encapsulant, back encapsulant, both front and back encapsulant, backsheet) of the PV laminate.

In some embodiments, the wire may be heated to temperatures of between about 400-600° C. For particular embodiments, this can be achieved by applying a difference of electric potential between the two ends of the wire.

The heated wire can then be pushed through encapsulant layer(s). This effectively separates the laminate into different parts.

According to some embodiments, the heat of the wire effectively degrades ("melts+burns") the encapsulant. In certain embodiments, the wire physically cuts through the encapsulant material. The encapsulant material may be merely softened to allow passage of the wire.

In particular embodiments, the wire may have a diameter of 0.5 mm or less. Specific embodiments may employ a wire having a diameter of between about 0.2-0.5 mm.

A wire material useful for embodiments, may exhibit high mechanical strength and sufficiently low electrical conductivity to generate the heat by resistive heating. Examples of possible candidates for wire materials include but are not limited to:
  NiCr alloy,
  stainless steel,
  FeCrAl alloy,
  aluminum (such as 6000 series),
  copper coated materials.

Delamination according to particular embodiments, may separate the top (e.g., glass) sheet and the rest of the layers. For some embodiments, the delamination process could separate the laminate into three (3) distinct layers: the top sheet (e.g., glass), the solar cell, and the backsheet. For some embodiments, the delamination process could separate the laminate from the backsheet.

Embodiments may determine where pressure is specifically to be applied as part of a delamination process. For example, embodiments may determine a location as to where the wire should engage with the module.

One possible approach to targeting a location of application of the hot wire may be based upon optics. That is, differences in refraction index of cover sheet (e.g., glass) versus encapsulant (e.g., EVA) may be detected.

Another possible approach to wire targeting may be based upon X-Ray Diffraction (DRX). One example could detect an amorphous structure of a glass cover sheet, versus a semi-crystalline structure of EVA.

One possible approach to wire targeting, is to have the wire push against the glass as to create an angle between 5-45° from the panel inclination. Exerting a force down on the wire can serve to keep the panel flat during processing.

For some embodiments, data relating to factors including but not limited to:
- panel size,
- panel model, and/or
- panel weight.

Could be stored in a database that is in turn referenced to output a thickness of the glass. The laminate could be aligned relating the model, manufacturer, and/or year to a database.

Use of a hot wire for delamination according to embodiments may offer one or more benefits. A first benefit is low energy use to heat up the wire. Another possible benefit is precise application of the wire to the laminate, resulting in clean separation of the layers.

Embodiments may employ testing of PV modules, in order to determine whether they can be reused or recycled. In addition to panel size, information such as width, length, height, thickness of glass, could assist in guiding the process. Such information could be obtained as part of a history file received with the panel. Alternatively, such information could be available from the manufacturer, solar panel owner, research institutes and/or public sources.

In particular, the transparent front cover sheet used in PV modules may be tempered glass. Such material is under compressive stress on the outside, and under tensile stress on the inside. When the tempered glass breaks, it releases the energy stored in the form of compressive and tensile stress.

Polarized light interacts differently with materials experiencing different stress levels. Regions of the material experiencing different stress, may appear as different colors.

Under some circumstances, panels having a broken cover sheet may not be eligible for reuse, and instead may be earmarked for recycling. Using polarized light, embodiments may facilitate rapid and accurate assessment of solar panel reuse.

That is, fractures release material tension, and thus change the visual pattern observed under polarized light. Thus under polarized light, glass may be seen to have a fracture revealed by a stress pattern different over that expected of intact tempered glass. Such an image may be acquired, stored, and accessed for manual or automatic review. This technique could detect fractures that are not detectable by human eye but that are nonetheless a determinant in deciding whether a module is earmarked for module recycling versus reuse.

Identification of damaged versus undamaged glass can be achieved using various type of devices. For example, particular embodiments can use polarimeter equipment, and/or polarizers and visual inspection.

Figure 3:
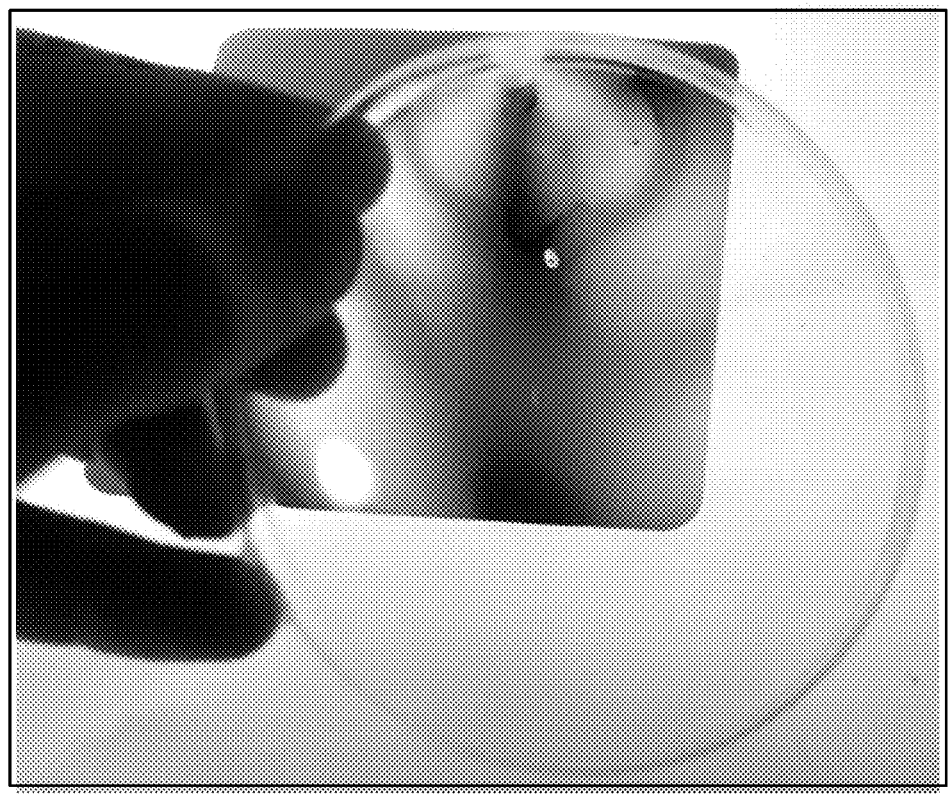
FIG. 3 shows glass under polarized light. Parts of the material under stress display different colors. Here, stress gradients point to the top where the stress is highest.

FIG. 3 shows glass under polarized light. Parts of the material under stress display different colors. Here, stress gradients point to the top where the stress is highest.

Figure 4:
FIG. 4 shows a shows a piece of glass under stress.

FIG. 4 shows a shows a piece of glass under high compression stress on the outside, and high tension stress on the inside. Polarized light highlights the stresses being experienced by the glass.

Testing of PV modules according to embodiments, may offer one or more benefits. One benefit is increased accuracy over visual inspection with the naked eye. Another benefit is reduced cost, as the polarimeter equipment and/or polarizers that are employed may be less expensive than specialized photovoltaic testing equipment.

It is noted that dirt and other debris may accumulate during the operation of photovoltaic (PV) panels owing to their deployment in the field. Such dirt covering can impair performance of a PV module.

During their lifetimes, solar panels may be periodically cleaned to ensure that maximum sunlight arrives at the PV solar cell. However, such periodic cleaning during operation lifetimes generally only takes place on a top surface (e.g., exposed glass). Moreover, once they are decommissioned, solar panels may be stockpiled unprotected from the environment, where additional dirt can accumulate.

Dirt (i.e., dust or particles accumulating in the posterior, anterior or side surfaces of a PV panel) can hinder the management of modules following their decommissioning. In the case of solar panel reuse, they can hinder testing to sort the modules (e.g., with respect to power output). In the case of solar panel recycling, dirt can mix with the particles of specific materials intended for recovered during the recycling process, lowering purity of the output material.

Accordingly, embodiments may implement cleaning approaches for solar panels. Such cleaning may occur at one or more stage(s) of end-of-life processing of a PV panel, e.g.:
- at initial intake/inspection;
- before and/or after deframing;
- before and/or after testing;
- before and/or after delamination;
- before and/or after material separation.

According to one approach, panels (including the frame or no longer including the frame) are laid flat horizontally on conveyor belts, and passed through a rotary device (comprising, e.g., sponges, mops, and/or cloths). These may comprise e.g., woven yarn and/or microfiber. Microfiber candidates include but are not limited to polyesters, polyamides, and/or polyester.

The rotary device can be dry, damp, or wet. In some embodiments, the panels can be maintained stationary as rotary sponges/mops/cloths move along the axis of the module.

Figure 5:
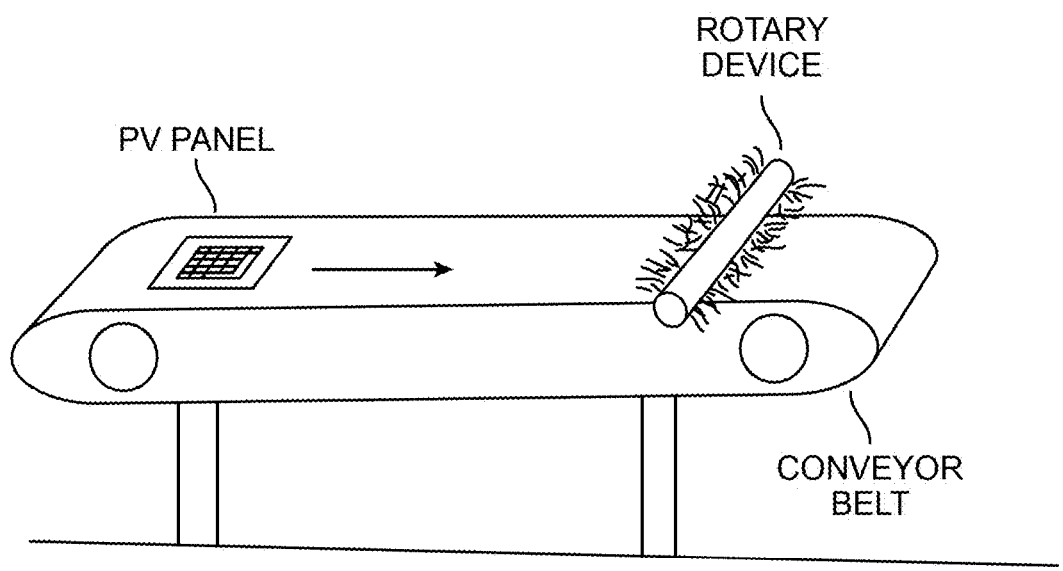
FIG. 5 shows a conveyor belt approach with the panel moving towards a rotary cleaning device.
Figure 6:
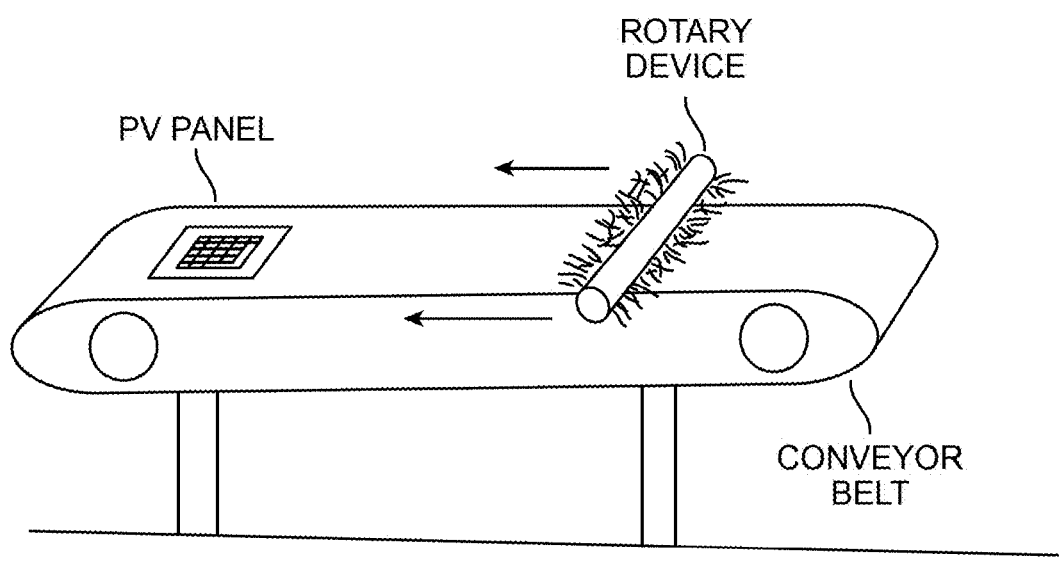
FIG. 6 shows a conveyor belt approach with the rotary cleaning device moving toward a panel.

According to various embodiments, the rotary sponges/mops/cloths may rotate about their own axes, with the panels moving on a conveyor belt. FIG. 5 shows an approach wherein a panel moves towards a rotary cleaning device. FIG. 6 shows an approach wherein a rotary cleaning device moves towards a panel.

Figure 7:
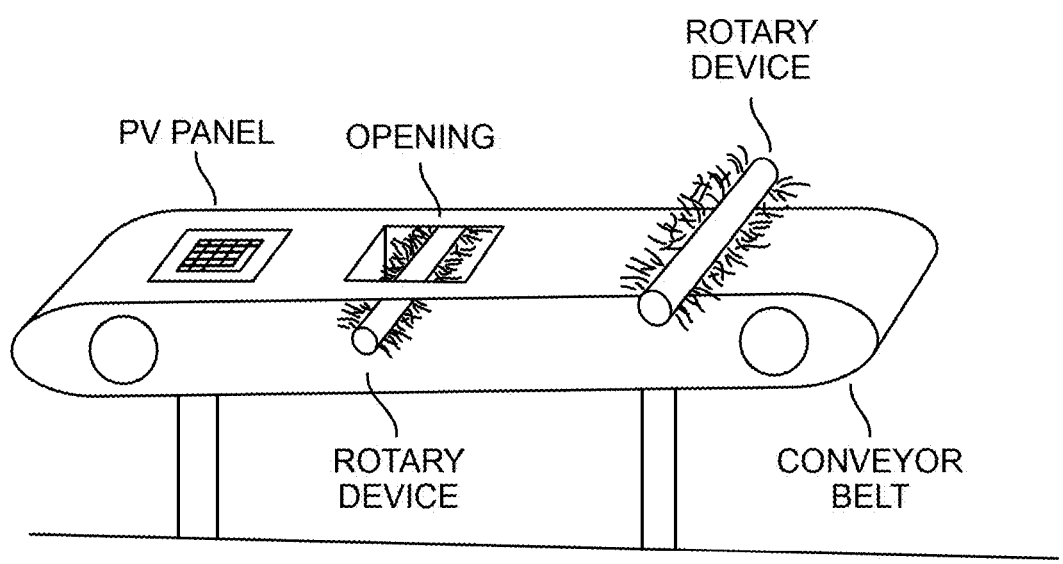
FIG. 7 shows a conveyor belt with an opening to clean both sides of the panel.

Particular embodiments may feature a conveyor belt including an opening to allow cleaning of both sides of the panel. FIG. 7 shows one embodiment of such an approach.

Figure 8:
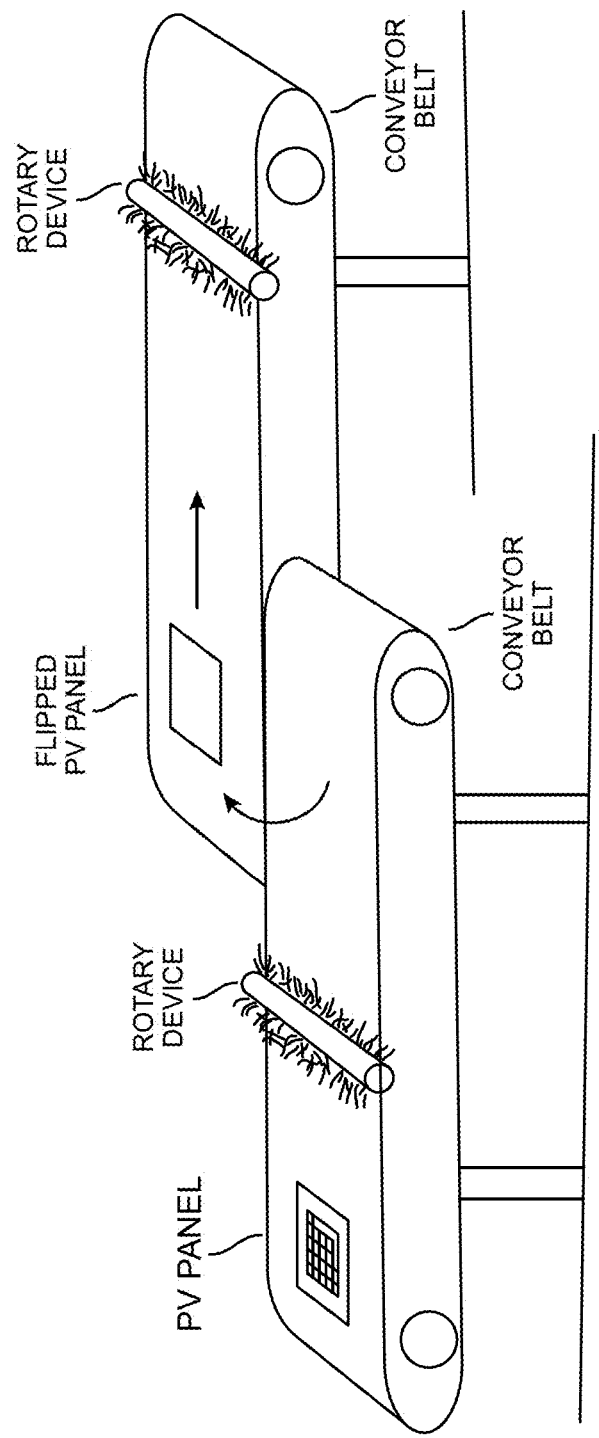
FIG. 8 shows a conveyor belt approach flipping panels to allow cleaning of both sides of a panel.

Various embodiments could flip the panels to allow cleaning of both sides of a panel. FIG. 8 shows one embodiment of such an approach.

Embodiments may or may not employ a second rotary device to clean the panels once they are flipped. Particular embodiments could have the rotary device move back and forth along the axis of the panel to ensure it cleans both sides of the panel.

Some embodiments could have the conveyor belt reverse the direction of movement after panels have been flipped. This can ensure that both sides are cleaned.

According to specific embodiments, PV panels could be vertically suspended (e.g., by their frames or by the layered structure lacking any frame). Two rotary sponges, mops, or cloths could be applied opposing sides of the panel. In some embodiments, the panels can remain in position while the rotary devices move perpendicular to the axis of the module.

Figure 9:
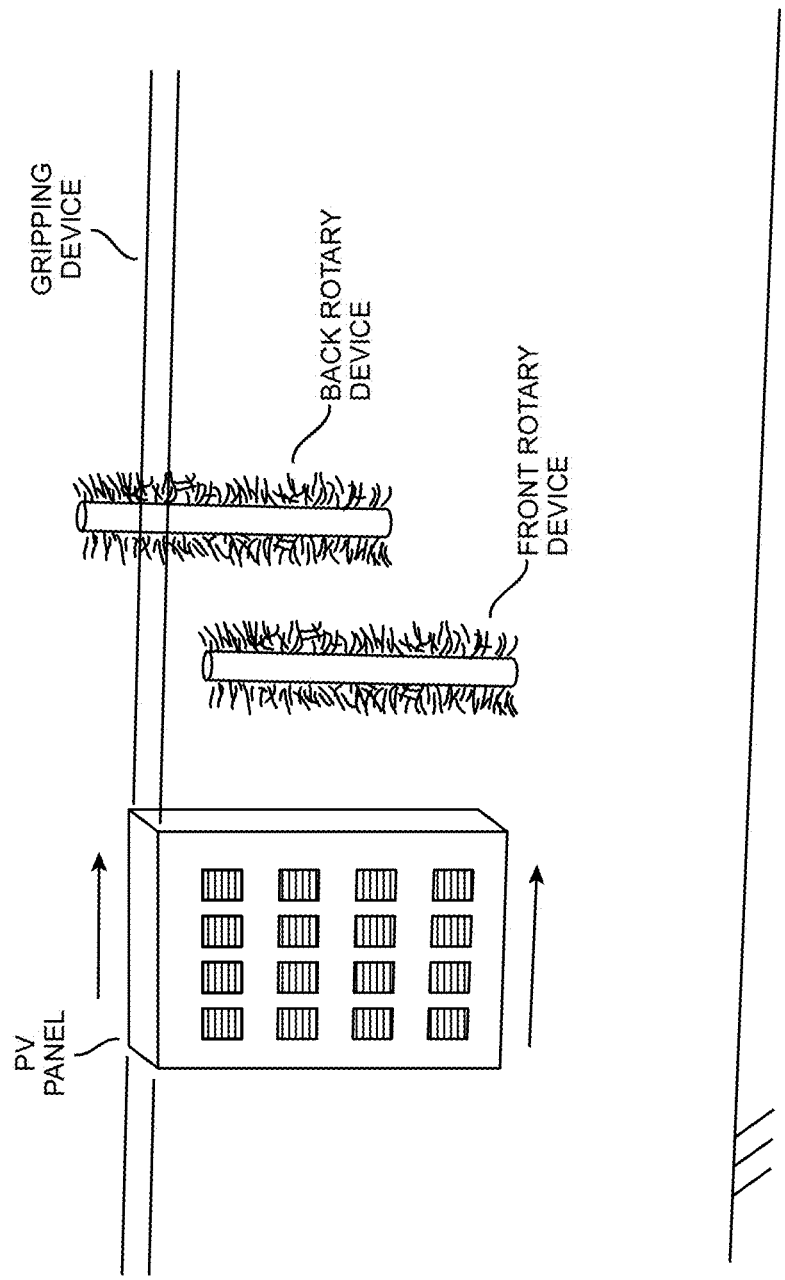
FIG. 9 shows a gripping device approach with the panel moving to a rotary cleaning device.
Figure 10:
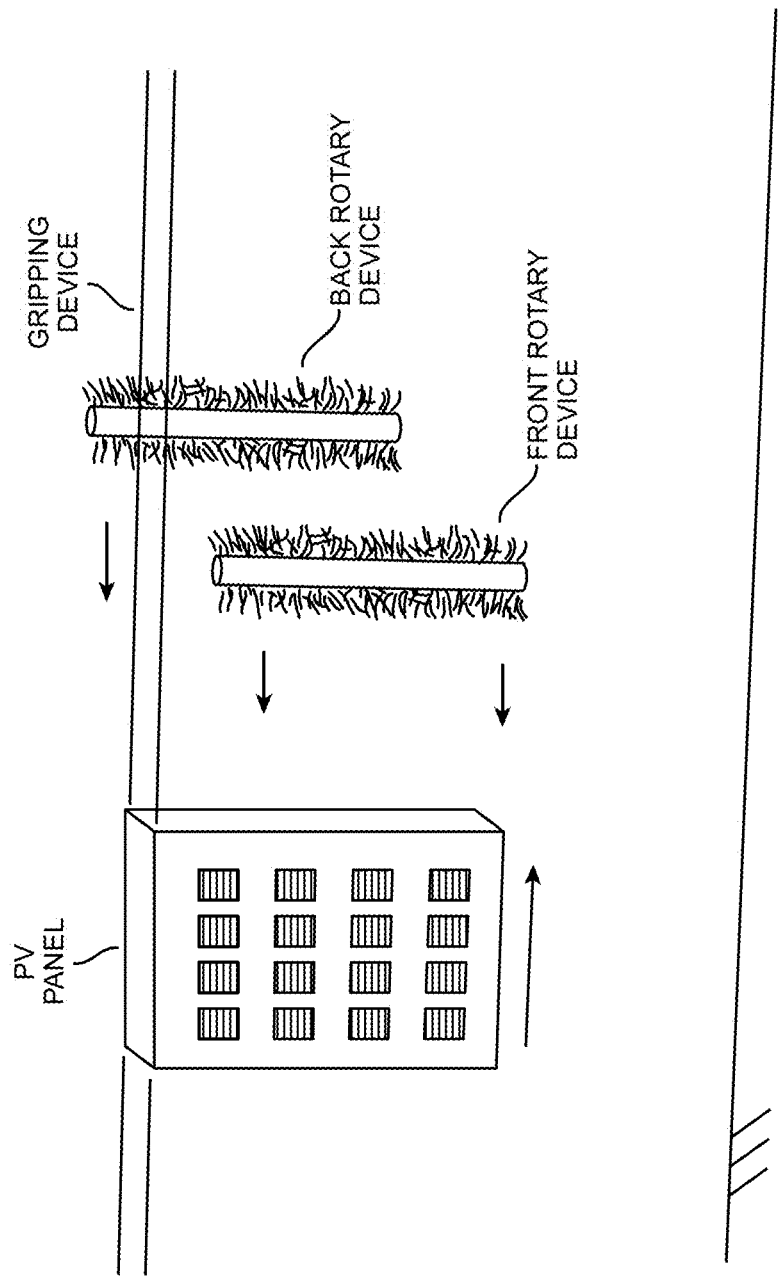
FIG. 10 shows a gripping device approach with the rotary cleaning device moving towards the panel.

Alternatively, the rotary devices may remain are fixed and only rotate about their own axis, and the panels are the ones who move through the conveyor belt. FIG. 9 shows an embodiment in which the panel moves towards rotary cleaning device. FIG. 10 shows an approach in which the rotary cleaning device moves towards the panel.

It is noted that embodiments may or may not employ more than one rotary device to assist in cleaning of the panels.

Certain embodiments may or may not reverse the direction of movement of the panels to ensure optimal cleaning of the panels. Various embodiments may or may not reverse the direction of movement of the rotary device(s) to ensure optimal cleaning of the panels.

While the above description has focused upon the use of rotary devices for cleaning, this is not required. Some embodiments may employ a pressure jet of water and/or an air jet to clear dirt and/or dry the panels.

Particular embodiments may suspend the panels vertically, and apply water and/or air jets to one or both sides, simultaneously or in sequence. Simultaneous application of jet(s) can desirably serve to counter balance forces applied to the module.

Particular embodiments may have multiple (e.g. between 2-4) jet angles at which the stream encounters the panel surface. Such multiple angles can aid in cleaning, and can act simultaneously or in sequence.

Embodiments for cleaning PV modules can be performed automatically or manually. In the latter case, one or more operators can handle the various devices such as sources of water and/or air jets.

Different ranges of pressure can be used. Jet pressures can be high, medium, or low. Examples of lower jet pressures can include from about 50-200 MPa.

According to some embodiments, panels can also be laid flat horizontally, with the jet applied horizontally as to aid in particle removal. Example angles can be from between about 1-20° from horizontal.

Horizontal or near-horizontal approaches may not use a conveyor belt with an opening so that both sides of the panel could be cleaned by jet(s). Horizontal or near-horizontal approaches may or may not flip upside down the panels, so that both sides can be cleaned by jet(s).

Horizontal or near-horizontal approaches may or may not employ a second water/air jet device to clean the panels. Embodiments may have the water and/or air jet device move back and forth along the axis of the panel, to clean one or both sides of the panel. Embodiments may have a conveyor belt reverse the direction of movement, in order to ensure both sides are cleaned.

While the above has described the application rotary devices and/or jets for cleaning, this is not required. Certain embodiments may use scraper devices, thereby avoiding water.

According to one such embodiment, panels may lay flat and be moved horizontally on a surface or conveyor belt. A scraper made with a triangular tip is used to remove particles from the surface of the module.

Figure 11:
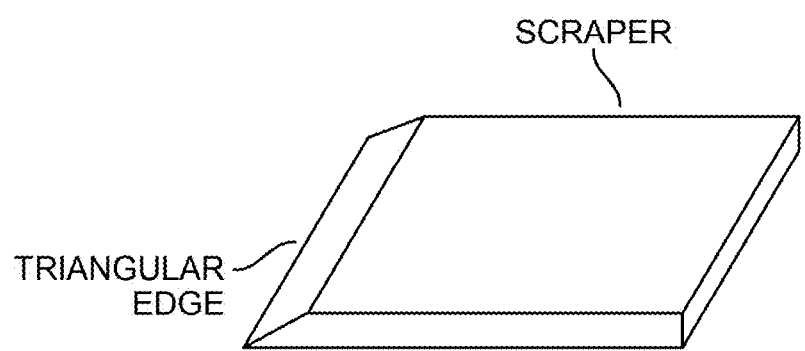
FIG. 11 shows a scraper with a triangular edge to remove particles.

A tip of the scraper has triangular shape with an angle between about 1-55° with the horizontal. FIG. 11 shows a scraper with a triangular edge to remove particles laying in the surface of the panels.

Various embodiments may have scraper(s) fixed in one position of the conveyor belt and the panels pass through. Some embodiments could have the panels be still, with scraper(s) moving along the surface of the panel.

Various embodiments may include follow up process(es). One example of a follow up process is the use of air suction such as a vacuum cleaner.

Again, embodiments employing a scraper may feature a conveyor belt with an opening so that both sides of the panel could be cleaned. Some embodiments may or may not flip upside down the panels to allow both sides to be cleaned.

Embodiments utilizing a scraper may or may not employ an additional scraper to clean the panels once they are flipped. Scraper(s) may move back and forth along the axis of the panel to ensure that both sides of a panel are cleaned. Embodiments may have the conveyor belt reverse the direction of movement to enhance cleaning.

According to some embodiments, a scraper may be plastic. Examples of materials forming a scraper can include but are not limited to:

Polyethylene Terephthalate (PET),
Low-Density Polyethylene (LDPE),
High-Density Polyethylene (HDPE),
Polypropylene (PP),
Polyisoprene, and/or
Polymethyl Methacrylate (PMMA).

Embodiments that utilize scraper(s) may be performed automatically or manually. For the latter, one or more operators could handle the scraper(s).

Details regarding overall flows of recycling and/or refurbishment of solar modules according to various embodiments, is now described.

Specifically, PV modules may be designed and manufactured to last as long as 25-30 years in operation. However, panels may be decommissioned prior to reaching such a threshold.

Some decommissioned modules may still be in working condition and may be replaced in the field (reused), while others are not. Deciding whether a module can be reused or if it should be recycled, is one aspect of the management of PV modules.

Figure 12:
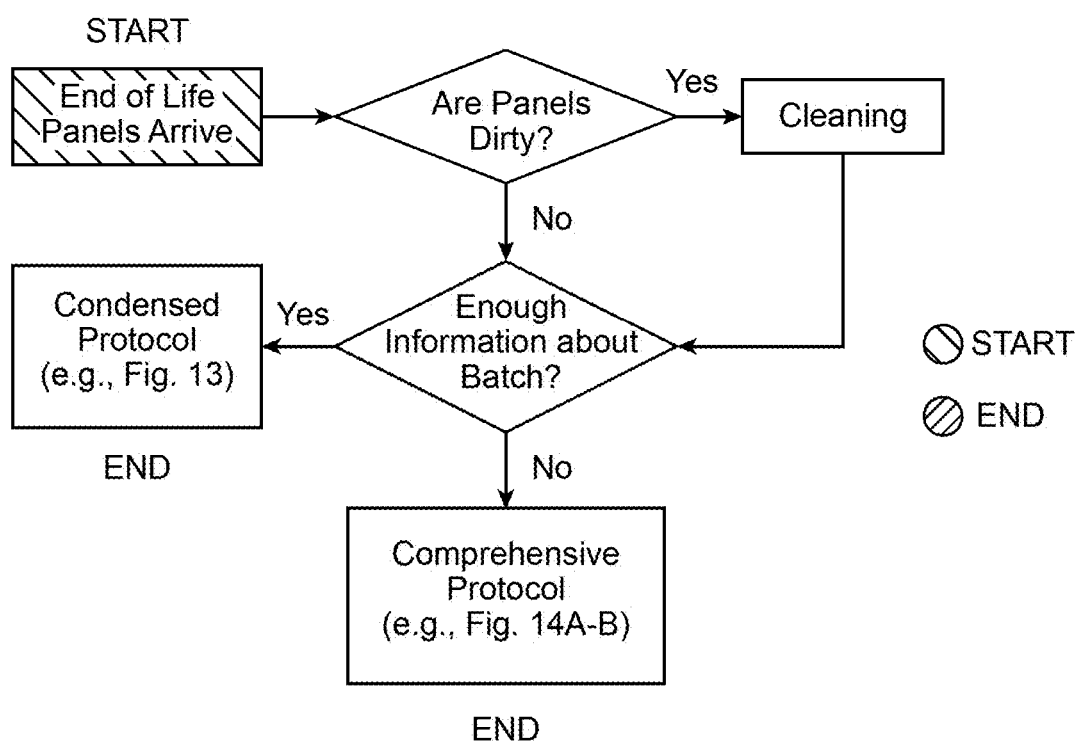
FIG. 12 shows a simplified flow of a cleaning procedure.

According to one embodiment, a series of steps shown in FIG. 12 can optimize, simplify, and lower the cost of testing used PV panels to determine their suitability for refurbishment or reuse.

As shown in FIG. 12, if a batch of panels arrives dirty (i.e., with visible dirt in the front or back of the panel), a cleaning procedure may take place. The cleaning procedure:
  may or may not involve the use of water and/or soap,
  may or may not use water jets,
  may or may not use air jets,
  may or may not use cloths (wet or dry), and/or
  may or may not use dry scrapers.

The cleaning process may be performed manually or in an automated fashion.

Sometimes information regarding the state of the incoming used PV panels may be available. Such information can include, but is not limited to one or more of:
  maintenance history;
  prior deployment conditions indicative of wear (e.g., harsh site conditions);
  panels known to be non-operational;
  power performance (i.e., how much energy is able to be output at the instant time by a module/string of modules);
  images of panels, including but not limited to visual (e.g., showing cracking), polarized (e.g., showing stress), photoluminescence, electroluminescence, and/or infrared;
  inverter or power electronics data.

Figure 13:
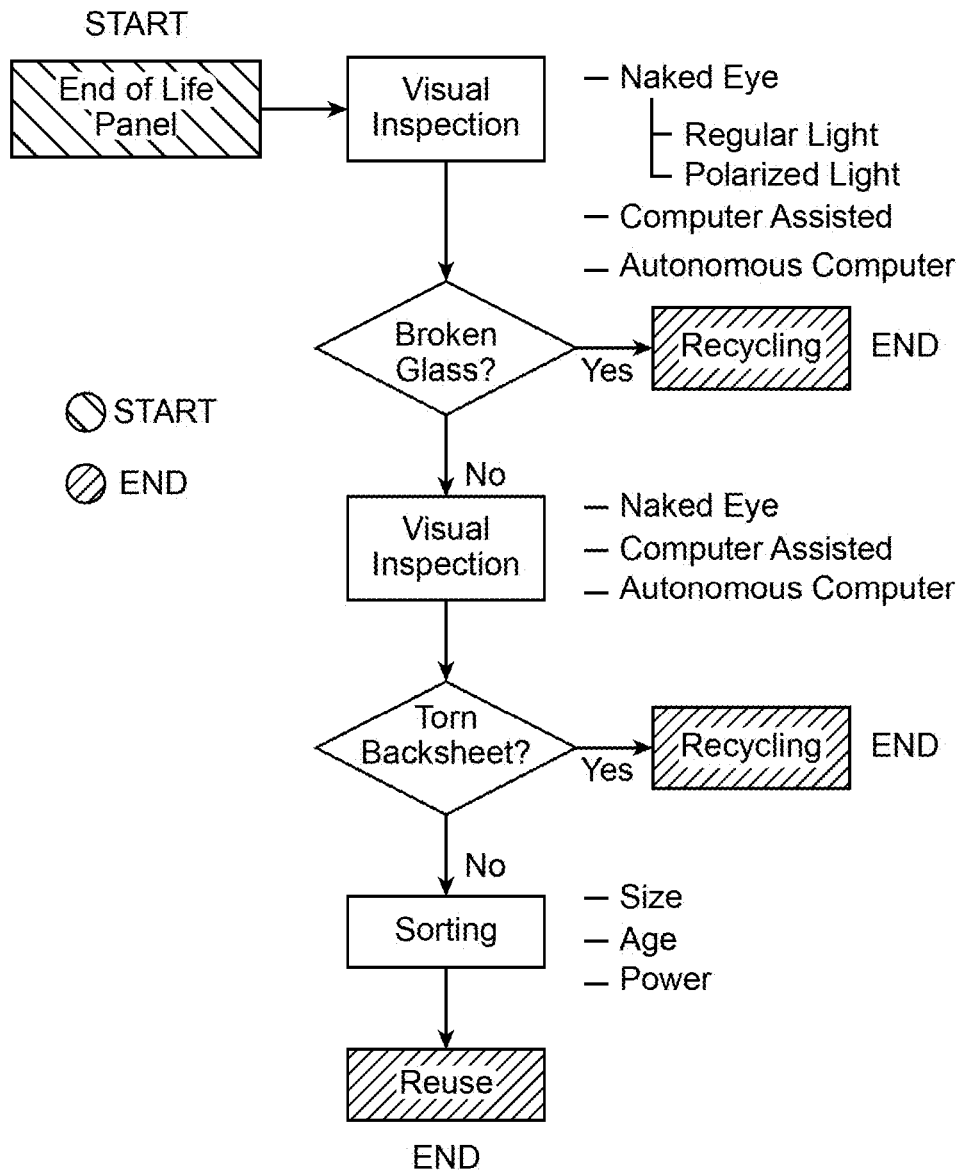
FIG. 13 shows a flow diagram of a condensed testing protocol.

When some information is available, a more thorough testing protocol may be bypassed. This lowers cost and speeds up the process. In such cases, a condensed testing protocol such as is shown in FIG. 13, may be implemented.

A condensed testing protocol according to an embodiment may involve visual inspection to look for damage on the front sheet (e.g. glass) and/or on the backsheet. Such inspection can be done manually and/or automatically. Such inspection can be done with or without the use of polarized light.

Damaged modules are sent for recycling. Undamaged modules may be sorted according to one or more factors including but not limited to:
- power output,
- size
- age
- history
- label/identification
- current output
- voltage output.

Figure 14A:
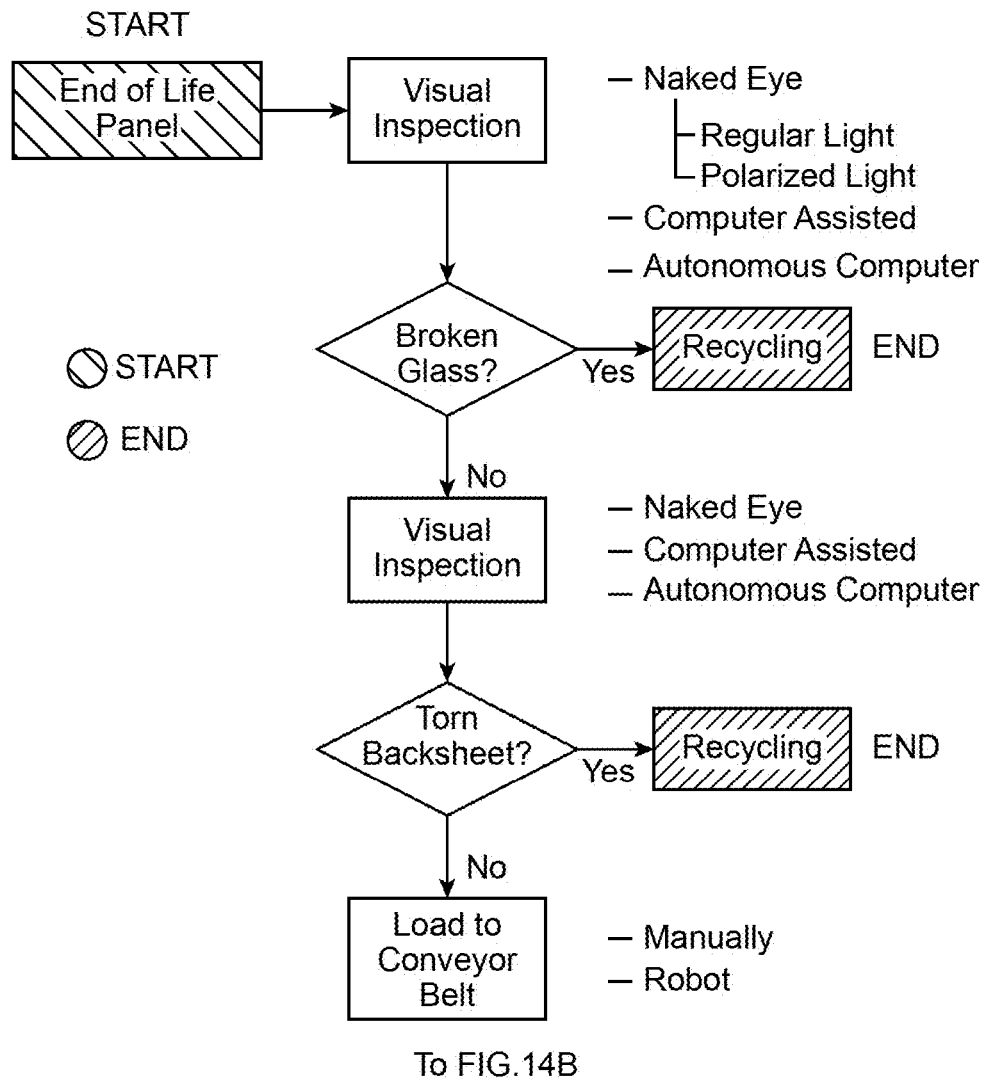
FIGS. 14A-B show a more detailed testing protocol.
Figure 14B:
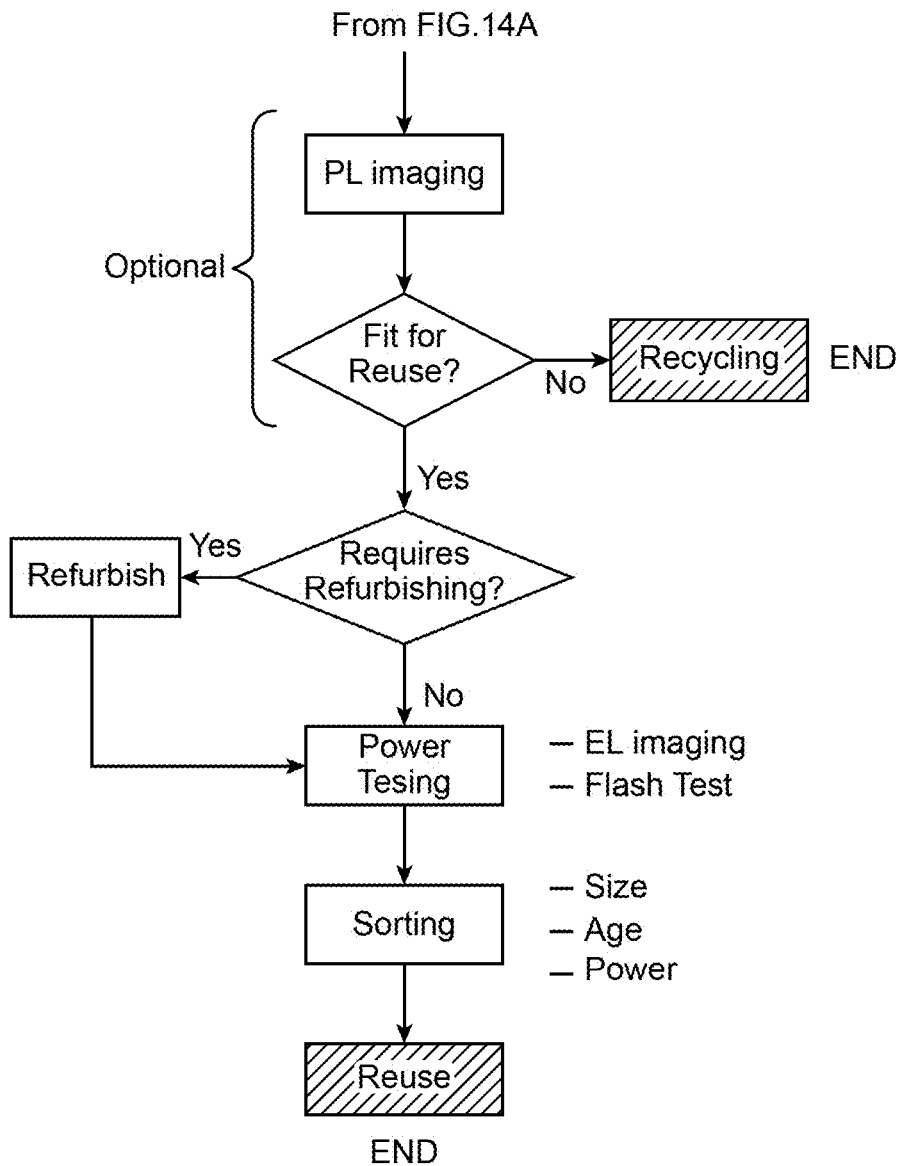

Returning now to the flow diagram of FIG. 12, when information is unavailable about the power output of the modules, a more comprehensive testing protocol may be utilized. Such a more detailed testing protocol is shown in FIGS. 14A-B.

The comprehensive testing protocol may or may not start with photoluminescence (PL) imaging. PL exposes the module to light in order to generate an electric response (e.g., current). PL imaging results may determine whether a module is unfit for reuse, and thus should be sent to recycling.

PL results may also decide if the module requires refurbishment. A module may call for refurbishment according to the PL imaging results, and/or if visual inspection reveals a junction box is damaged.

If a module requires refurbishment, it can first be refurbished accordingly before moving to the next step. For example, connectors that are worn or cracked can be replaced.

It is noted that a module may include diodes and other electronics. These may be considered during refurbishment, where the junction box is inspected for a fault that can be resolved to reuse the module.

If a module does not require refurbishment, it can be tested. A variety of apparatuses can be used for testing, including but not limited to one or more of:
- a flash tester,
- visual inspection,
- PL,
- electroluminescent (EL) imaging,
- infra-red imaging,
- wet leakage for safety.

EL and PL are different approaches. While PL uses light to elicit an electric response, for EL current is used to elicit a light response.

The output (result) of EL and PL are similar—an image of the module revealing special properties (akin to an Xray to look at human bones). EL and PL can reveal issues including but not limited to:
- micro cracks,
- dead cells, and/or
- electron movement (minority carrier lifetime).

It is noted that simple visual inspection can show cracks and failures in the glass, backsheet, or cell. Visual inspection can spot broken frames, and/or show moisture concentration (resulting, e.g., from leaks.)

Infrared imaging shows a heat map of the modules, and can assist in identifying "dead cells". A cell that is "dead" (faulty, non-functional) end up heating up more than its counterparts, producing a different color in the heat map.

According to particular embodiments, testing can be performed with the frame in place. This is because where testing reveals a module that is eligible for refurbishment and reuse, prior removal of the frame can be undesirable for these purposes.

Testing can determine the working condition of the module or string thereof, including characteristics including but not limited to:
- power output,
- current output,
- voltage output,
- cracks in PV cells,
- string deterioration,
- delamination.

As shown in FIGS. 14A-B, modules undergoing testing can then be sorted according to one or more factors including but not limited to:
- power output,
- age
- size
- number of cells
- weight.

It is emphasized that the flow of events depicted in the diagrams of FIGS. 12-14B are merely examples, and should not be construed as exclusive or limiting. Thus, the order of events may differ depending upon the particular embodiment. Moreover certain events may be omitted, or additional events may take place, again depending upon the specific embodiment.

While separate, dedicated tools may be used for each of the activities described herein, this is not required. Certain embodiments may combine multiple functionality in a single tool. For example, some embodiments could combine PL and polarized light inspection in a same tool. Also, a deframing tool could further serve to remove a junction box from a module.

It is also emphasized that the above approaches may be utilized alone, or in various combinations in order to effect the recycling and/or refurbishment of solar modules.

Clause 1A. A method comprising:
receiving a used solar panel comprising a transparent top sheet;
applying light to the transparent top sheet; and
detecting a fracture in the transparent top sheet based upon polarized light from the transparent top sheet.

Clause 2A. A method as in Clause 1A further comprising testing a current output of the used solar panel.

Clause 3A. A method as in any of Clauses 1A or 2A further comprising removing a junction box from the used solar panel.

Clause 4A. A method as in any of Clauses 1A, 2A, or 3A further comprising removing a frame from the used solar panel.

Clause 5A. A method as in any of Clauses 1A, 2A, 3A, or 4A further comprising removing cabling from the used solar panel.

Clause 6A. A method as in any of Clauses 1A, 2A, 3A, 4A, or 5A wherein the used solar panel comprises a laminate and the method further comprises performing delamination using a wire.

Clause 7A. A method as in Clause 6A wherein the wire is heated.

Clause 8A. A method as in any of Clauses 1A, 2A, 3A, 4A, 5A, 6A, or 7A further comprising cleaning the used solar panel.

Clause 9A. A method as in any of Clauses 1A, 2A, 3A, 4A, 5A, 6A, 7A, or 8A further comprising refurbishing the used solar panel.

Clause 10A. A method as in Clause 9A wherein the refurbishing comprises replacing a backsheet.

Clause 11A. A method as in any of Clauses 1A, 2A, 3A, 4A, 5A, 6A, 7A, 8A, 9A, or 10A further comprising recycling the used solar panel.

Clause 12A. A method as in Clause 11A wherein the recycling comprises shredding the transparent top sheet.

Clause 13A. A method as in any of Clauses 1A, 2A, 3A, 4A, 5A, 6A, 7A, 8A, 9A, 10A, 11A, or 12A wherein the transparent top sheet comprises glass.

Clause 14A. A method as in any of Clauses 1A, 2A, 3A, 4A, 5A, 6A, 7A, 8A, 9A, 10A, 11A, 12A, or 13A wherein the detecting and the recycling are performed at a site of installation of the used solar panel.

Clause 15A. A method as in any of Clauses 1A, 2A, 3A, 4A, 5A, 6A, 7A, 8A, 9A, 10A, 11A, 12A, 13A, or 14A wherein the used solar module comprises photovoltaic material selected from at least one of monocrystalline silicon, polycrystalline silicon, amorphous silicon, cadmium telluride, copper indium gallium selenide, copper indium selenide, polymer; and perovskite.

Clause 16A. A method as in any of Clauses 1A, 2A, 3A, 4A, 5A, 6A, 7A, 8A, 9A, 10A, 11A, 12A, 13A, 14A, or 15A wherein the used solar panel is selected from one of monofacial, bifacial, heterojunction, tunnel oxide passivated contact solar (TOPCON), passivated emitter and rear contact (PERC), tandem, and a roof shingle.

Clause 17A. A method as in any of Clauses 1A, 2A, 3A, 4A, 5A, 6A, 7A, 8A, 9A, 10A, 11A, 12A, 13A, 14A, 15A, or 16A further comprising testing.

Clause 18A. A method as in Clause 17A wherein the testing is selected from one or more of visual inspection, electroluminescent imaging, infra-red imaging, and wet leakage.

Clause 19A. A method as in any of Clauses 1A, 2A, 3A, 4A, 5A, 6A, 7A, 8A, 9A, 10A, 11A, 12A, 13A, 14A, 15A, 16A, 17A, or 18A further comprising sorting.

Clause 20A. A method as in Clause 19A wherein the sorting is based upon one or more of:
size;
width;
length;
height;
number of cells;
weight;
number of junction box(es);
location of junction box(es);
potting of junction box(es);
frame structure (e.g., including cross-bar or not);
frame construction (e.g., screwed or bracketed);
thickness of glass;
model;
manufacturer;
year;
label;
identification;
current output.

Clause 21A. A method as in any of Clauses 19A or 20A wherein the sorting is based upon one or more factors stored in a database.

Clause 1B. A method comprising:
receiving a used solar panel comprising laminate; and
applying a heated wire to separate the used solar panel at the laminate.

Clause 2B. A method as in Clause 1B further comprising removing one or more of a junction box, a frame, and cabling from the used solar panel.

Clause 3B. A method as in any of Clauses 1B or 2B wherein the wire is heated by a current.

Clause 4B. A method as in any of Clauses 1B, 2B, or 3B wherein the laminate comprises at least one of Ethylene-vinyl acetate (EVA), silicone, polyolefin elastomer (POE), and Polyvinyl butyral (PVB).

Clause 5B. A method as in any one of Clauses 1B, 2B, 3B, or 4B wherein the applying is targeted.

Clause 1C. A method comprising:
receiving a used solar panel;
testing the used solar panel; and
sorting the used solar panel based upon a factor stored in a database.

Clause 2C. A method as in Clause 1C further comprising receiving a package of information about the used solar panel, wherein the sorting is further based upon the information.

Clause 3C. A method as in any of Clauses 1C or 2C further comprising cleaning the used solar panel.

Clause 4C. A method as in any of Clauses 1C, 2C, or 3C wherein the testing comprises at least one of:
flash testing;
visual inspection;
photoluminescence imaging;
electroluminescent imaging;
determining a working condition;
polarimetry;
infra-red imaging; and
wet leakage.

Clause 5C. A method as in any of Clauses 1C, 2C, 3C, or 4C further comprising removing a junction box from the used solar panel.

Clause 6C. A method as in any of Clauses 1C, 2C, 3C, 4C, or 5C further comprising removing a top transparent top sheet from the used solar panel.

Clause 7C. A method as in any of Clauses 1C, 2C, 3C, 4C, 5C, or 6C further comprising removing a frame from the used solar panel.

Clause 8C. A method as in any of Clauses 1C, 2C, 3C, 4C, 5C, 6C, or 7C further comprising removing cabling from the used solar panel.

Clause 1D. A method comprising:
receiving a used solar panel;
referencing a factor stored in a database to output information relating to the used solar panel; and
sorting the used solar panel based upon the information.

Clause 2D. A method as in Clause 1D wherein the information is
obtained as part of a history file.

Clause 3D. A method as in any of Clauses 1D or 2D wherein the information is obtained from a manufacturer of the used solar panel, an owner of the used solar panel, a research institute, or a public source.

Clause 4D. A method as in any of Clauses 1D, 2D, or 3D wherein the information is a thickness of glass of the used solar panel.

Clause 5D. A method as in Clause 1D, 2D, 3D, or 4D wherein the factor is a model of the used solar panel.

Clause 1E. A method comprising:
receiving a used solar panel comprising a transparent top sheet;
applying light to the transparent top sheet; and
detecting a stress pattern in the transparent top sheet based upon polarized light from the transparent top sheet.

Clause 2E. A method as in Clause 1E wherein the transparent top sheet comprises glass.

Clause 3E. A method as in any of Clauses 1E or 2E wherein the stress pattern indicates a fracture.

Clause 4E. A method as in any of Clauses 1E or 2E wherein the stress pattern is changed over an intact transparent top sheet.

Clause 5E. A method as in any of Clauses 1E, 2E, 3E, or 4E wherein the stress pattern is detected utilizing at least one of polarimeter equipment, a polarizer, and visual inspection.

According to embodiments, recycling of PV modules may be accomplished by shredding. In particular embodiments, the shredding can take place in two or more distinct phases.

Figure 15:
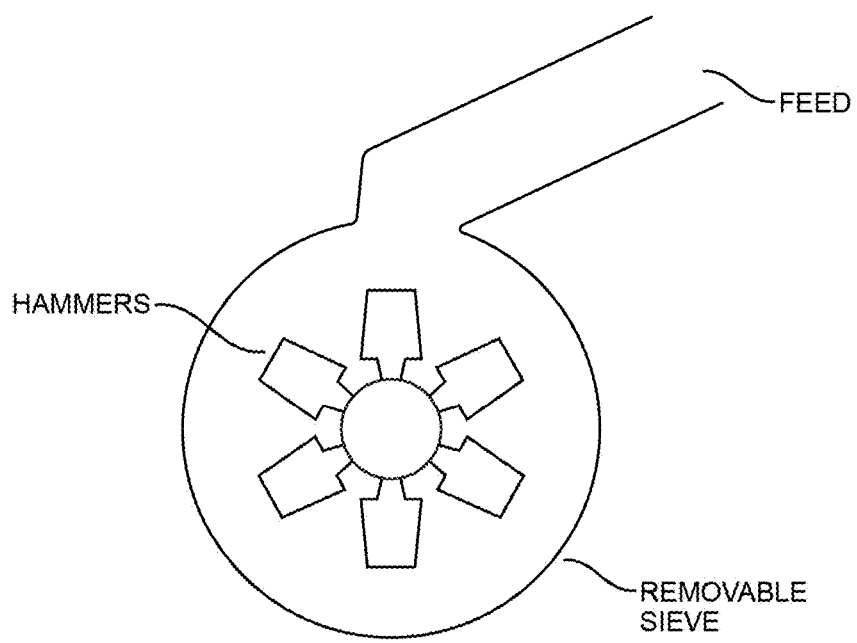
FIG. 15 shows an apparatus comprising a removable sieve.
Figure 16:
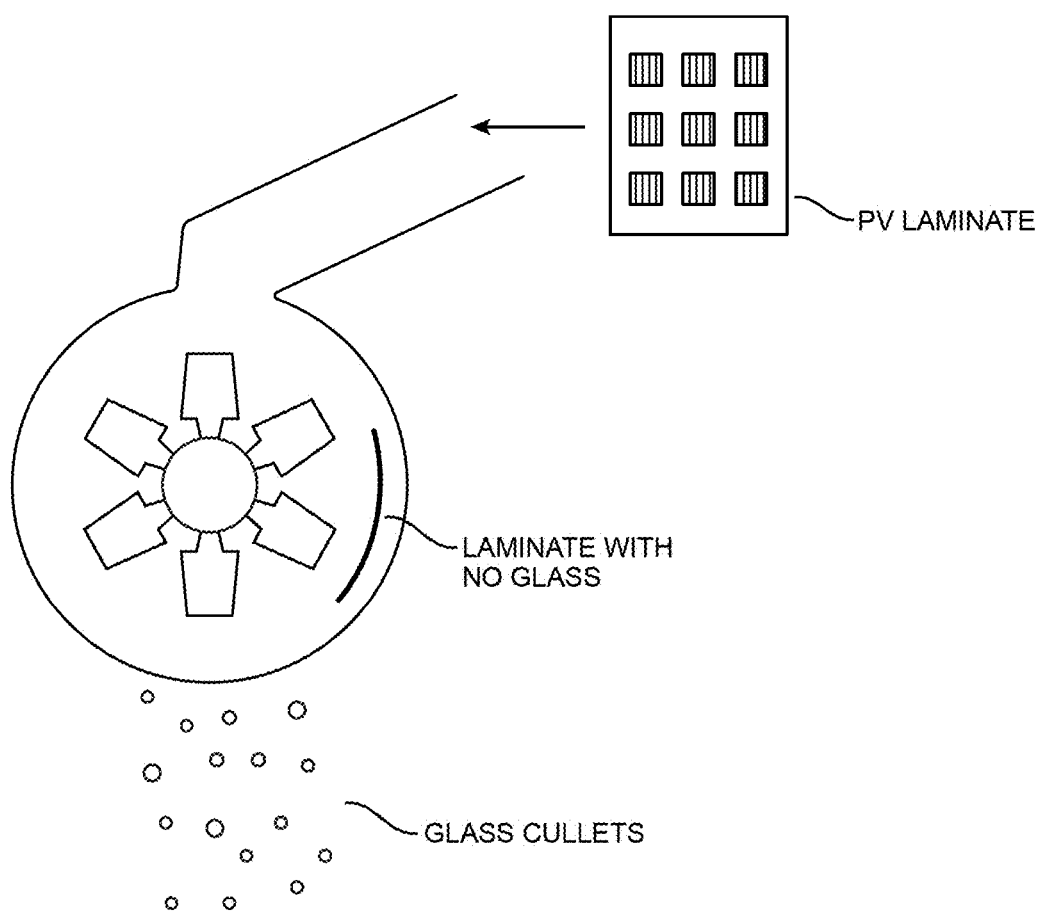
FIG. 16 shows an apparatus comprising a feed receiving a Photovoltaic (PV) laminate, and outputting glass culets.
Figure 17:
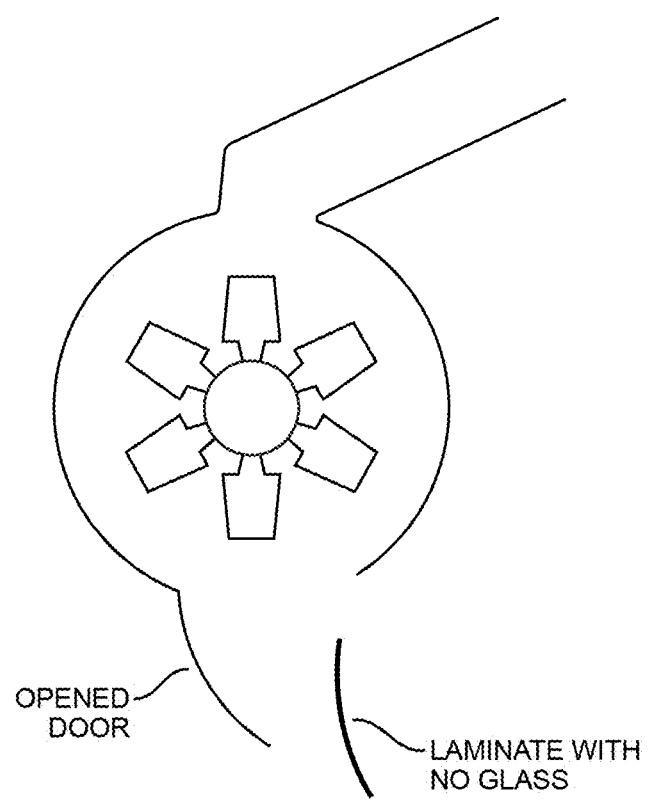
FIG. 17 shows an apparatus having a door opening to allow a PV laminate to exit.

As shown in FIGS. 15-17, in a first shredding phase the main material targeted is the glass. The glass can be present in a single layer (e.g., in monofacial modules), or could be present in two different layers (e.g., in bifacial modules).

In the second phase of shredding, materials other than glass are targeted. For certain embodiments, polymeric materials (e.g., plastics and/or laminate) can be targeted.

The first shredding phase may comprise applying mechanical shock (e.g., normal forces or impact) and/or shear stress (e.g., a blind knife) to the laminate as a whole. This can be done using hammers and/or knives.

This first phase shredding breaks the glass into several small pieces, while leaving the other materials in bigger fragments. In particular, owing to its ductile nature a polymer backsheet may be less affected by impact mechanical shock and/or shear stress than brittle glass forming the cover sheet.

The first shredding phase may involve materials that are resistant to abrasion. Examples can include but are not limited to one or more of:
  VND steel alloys
  O1 steels—alloys that contain manganese, chromium or both)
  carbon steel,
  high speed steel,
  cemented carbide,
  vanadium steel,
  chromium-molybdenum steel,
  hardened steel,
  other alloys (e.g. Cr12Mov, D2, H13, 55SiCr).

Performance of the first shredding phase results in two (2) main material groupings within the shredder equipment:
  1) smaller fractions containing mostly glass, and
  2) larger fractions containing the backsheet and other laminate materials still adhered thereto.

In order to separate into the two groupings, the shredded material resulting from the first phase may be mechanically sieved. A sieve with openings of between about 2-50 mm may be useful for separating the fractions.

Sieving may be attained statically dynamically. Dynamic sieving may be achieved by vibrating the chamber in which the materials reside (inside or outside of the shredder device).

The material retained in the sieve (i.e., being larger than the opening) then goes into the second shredding phase.

The material that is not retained in the sieve—i.e., being smaller than the opening (containing mostly glass) is transported to a container. This effectively bypasses the second shredding phase, desirably reducing a volume of material handled by the second shredding.

The second phase of shredding uses equipment that can operate with different (e.g., higher) rotational speeds and/or impose different (e.g., higher) shear stress upon the materials entering the shredding chamber. Rotations between 1000 and 2000 RPM produce good results for this second phase.

During the second shredding phase, the equipment applies shear stress to the fraction, until its pieces are small enough to go through an attached sieve attached to it. The second phase shredding equipment may be better suited to deal with the constituent ductile polymeric and/or metal materials of PV modules. Additional shredding (and/or granulating) phases can be added to this ductile fraction.

The second phase shredder can differ in various ways from the first phase shredder. For example, the second phase shredder can have a different (e.g., smaller) size, reducing costs and increasing efficiency of the process.

The sieve used for the second phase can have openings between 2-50 mm, depending on the desired application. Again, sieving may be attained statically or dynamically by vibrating the chamber in which the materials reside (inside or outside of the shredder device).

The output of the second phase then may or may not be transported to the same container that has received the material from the first shredding phase. Thus according to some embodiments, effectively the entire module may rest in one single container in pieces.

In some embodiments, the two outputs may be kept separate, as the glass from the first shredder may already be relatively pure. This promotes an effective separation of materials in respect to the original PV module.

An additional way to shred PV panels, is to leverage the fact that glass is brittle material that is not protected in the PV laminate structure. Thus, equipment using impact and/or compressive stress may break and crush the glass, but have relatively little effect upon the remaining material(s)—e.g., other, more ductile layers in the sandwich structure.

Accordingly, a two phase shredding process can assist in crushing the panels more effectively, while also desirably reducing wear upon the equipment. In the first phase shredding, a pressure, impact, shock or compression crusher/mill can be used. Examples can include but are not limited to:
  jaw crusher,
  gyratory crusher,
  impact crusher,
  impact mill,
  hammer mill, and/or
  ball mill.

This first shredding phase will break the glass into small culets, but may not fully break up the backsheet, encapsulant, and/or other materials within those two layers. The first shredding phase may also promote detachment of glass culets from the remainder of the photovoltaic module.

Once the glass is detached from the remainder after the first phase shredding, various different options exist for separation. One approach uses sieve(s)—e.g., shown in FIG. 15—that will allow the small glass culets to pass while stopping the bigger pieces of the backsheet, encapsulant, and the rest.

FIG. 16 shows an apparatus comprising a feed receiving a PV laminate, and outputting glass culets. FIG. 17 shows an apparatus having a door opening to allow a PV laminate to exit.

Another separation approach may be to pick up the backsheet material manually or automatically, given that it will be present in one or more large, easily identifiable pieces. An approach to separation approach may rely upon an optical sorter.

Still another separation approach may employ density separators—e.g., so that the glass sinks while the remaining layers rise. Such an approach may use air, water, and/or other density media.

Once the glass is separated out, materials remaining after the first phase can be delaminated using, e.g.:
  chemical solvents,
  thermal processes (e.g. combustion, pyrolysis); and/or mechanical techniques.

Another option for processing larger remaining materials remaining after the first phase shredding, is to put them through a shear stress crusher/shredder (e.g. knife mill). This can decrease the size of the remaining particles, and thereby liberate the materials contained inside the encapsulant.

The liberated materials can be further separated by chemical, thermal, and/or mechanical approaches.

While separate, dedicated tools may be used for each of the activities described herein, this is not required. Certain embodiments may combine multiple functionality in a single tool. For example, some embodiments could perform both shredding phases within a same tool, or even within a same (e.g., rotating) chamber of a tool. Also, a same tool could further serve to remove a frame and/or junction box from a module prior to the first shredding phase.

In conclusion, particular embodiments involve processing photovoltaic modules in two or more shredding phases. For some specific embodiments, the results main be the following two groupings:
1) smaller fractions comprising brittle materials (e.g., glass, silicon, and/or other solar cell materials);
2) larger fractions comprising a back sheet and other ductile materials It is emphasized that the approaches described above may be utilized alone, or in various combinations, in order to effect the recycling.

Clause 1F. A method comprising:
performing a first phase shredding upon a photovoltaic module including a glass sheet and a polymer encapsulant;
separating broken glass from results of the first phase shredding including the polymer encapsulant;
following the separating, performing a second phase shredding upon the results of the first phase shredding including the polymer encapsulant.

Clause 2F. A method as in Clause 1F wherein the separating employs a sieve.

Clause 3F. A method as in Clause 2F wherein the sieve has openings of between about 2-50 mm.

Clause 4F. A method as in any of Clauses 1F, 2F, or 3F further comprising:
prior to performing the second phase shredding, delaminating the results of the first phase shredding.

Clause 5F. A method as in any of Clauses 1F, 2F, 3F, or 4F further comprising:
prior to performing the first phase shredding, removing a junction box and/or a frame from the photovoltaic module.

Clause 6F. A method as in any of Clauses 1F, 2F, 3F, 4F, or 5F wherein the first phase shredding involves application of a hammer and/or a knife.

Clause 7F. A method as in any of Clauses 1F, 2F, 3F, 4F, 5F, or 6F wherein the first phase shredding involves rotation.

Clause 8F. A method as in any of Clauses 1F, 2F, 3F, 4F, 5F, 6F, or 7F wherein the separating is based upon density.

Clause 9F. A method as in any of Clauses 1F, 2F, 3F, 4F, 5F, 6F, 7F, or 8F wherein the separating is based upon optical sorting.

Clause 10F. A method as in any of Clauses 1F, 2F, 3F, 4F, 5F, 6F, 7F, 8F, or 9F further comprising:
uniting results of the first phase shredding with results of the second phrase shredding in a same container.

Clause 11F. A method as in any of Clauses 1F, 2F, 3F, 4F, 5F, 6F, 7F, 8F, 9F, or 10F wherein conditions of the first phase shredding are different from conditions of the second phase shredding.

Clause 1G. An apparatus comprising:
a first phase shredder configured to expose a photovoltaic module comprising a glass cover sheet and a polymer laminate to first shredding conditions;
a separator configured to remove glass culets from results of the first phase shredder; and
a second phase shredder configured to expose results of the first phase shredder after the separating, to second shredding conditions.

Clause 2G. An apparatus as in Clause 1G wherein the separator comprises a sieve.

Clause 3G. An apparatus as in Clause 2G wherein the sieve has openings of between about 2-50 mm.

Clause 4G. An apparatus as in any of Clauses 1G, 2G, or 3G wherein the first phase shredder comprises a hammer.

Clause 5G. An apparatus as in any of Clauses 1G, 2G, 3G, or 4G wherein the first phase shredder comprises a knife.

Clause 6G. An apparatus as in any of Clauses 1G, 2G, 3G, 4G, or 5G wherein the first phase shredder is configured to rotate.

Clause 7G. An apparatus as in any of Clauses 1G, 2G, 3G, 4G, 5G, or 6G further comprising a deframer to provide the photovoltaic module to the first phase shredder without a frame.

Clause 8G. An apparatus as in any of Clauses 1G, 2G, 3G, 4G, 5G, 6G, or 7G further comprising:
a container uniting glass culets from the first phase shredder with results of the second phase shredder.

Clause 9G. An apparatus as in any of Clauses 1G, 2G, 3G, 4G, 5G, 6G, 7G, or 8G wherein the first phase shredder comprises a door.

What is claimed is:

1. A method comprising:
performing a first phase shredding upon a photovoltaic module including a glass sheet and a polymer encapsulant;
separating broken glass from results of the first phase shredding including the polymer encapsulant;
following the separating, performing a second phase shredding upon the results of the first phase shredding including the polymer encapsulant; and
prior to the first phase shredding, testing the photovoltaic module by applying polarized light to the glass sheet.

2. The method as in claim 1 wherein the separating employs a sieve.

3. The method as in claim 1 wherein the sieve has openings of between about 2-50 mm.

4. The method as in claim 1 further comprising:
prior to performing the second phase shredding, delaminating the results of the first phase shredding.

5. The method as in claim 1 further comprising:
prior to performing the first phase shredding, removing a junction box and/or a frame from the photovoltaic module.

6. The method as in claim 1 wherein the first phase shredding involves application of a hammer and/or a knife.

7. The method as in claim 1 wherein the first phase shredding involves rotation.

8. The method as in claim 1 wherein the separating is based upon density.

9. The method as in claim 1 wherein the separating is based upon optical sorting.

10. The method as in claim 1 further comprising:
uniting results of the first phase shredding with results of the second phrase shredding in a same container.

11. The method as in claim 1 wherein conditions of the first phase shredding are different from conditions of the second phase shredding.

12. The method as in claim 1 wherein the testing is performed with a polarizer.

13. The method as in claim 1 wherein the testing is performed with polarimetry equipment.

14. The method as in claim 1 wherein the testing detects a stress pattern.

15. The method as in claim 1 wherein the testing detects a fracture.

16. The method as in claim 1 wherein the testing detects a color difference.

17. The method as in claim 1 wherein the testing comprises visual inspection performed with a naked eye.

18. The method as in claim 1 wherein the testing comprises visual inspection performed with computer assistance.

19. The method as in claim 1 wherein the testing comprises visual inspection performed with an autonomous computer.

20. The method as in claim 1 further comprising cleaning the photovoltaic module.

* * * * *